(12) United States Patent
Berndtsson

(10) Patent No.: US 7,004,400 B2
(45) Date of Patent: Feb. 28, 2006

(54) DEVICE FOR AND METHOD OF PROCESSING INTEGRATED CIRCUITS

(75) Inventor: Anders Berndtsson, Kullavik (SE)

(73) Assignee: Atlantic Zeiser GmbH, Emmingen (DE)

( * ) Notice: Subject to any disclaimer, the term of this patent is extended or adjusted under 35 U.S.C. 154(b) by 214 days.

(21) Appl. No.: 10/655,181

(22) Filed: Sep. 4, 2003

(65) Prior Publication Data

US 2004/0112951 A1    Jun. 17, 2004

(30) Foreign Application Priority Data

Dec. 11, 2002  (DE) ............................... 102 57 777
Jul. 25, 2003   (EP) ................................. 03016958

(51) Int. Cl.
*G06K 19/06*       (2006.01)
(52) U.S. Cl. .................................................... 235/492
(58) Field of Classification Search ................ 235/492, 235/485–486; 156/264, 176, 181, 250
See application file for complete search history.

(56) References Cited

U.S. PATENT DOCUMENTS

| | | | | |
|---|---|---|---|---|
| 4,827,425 | A | * | 5/1989 | Linden ........................ 700/225 |
| 5,943,238 | A | * | 8/1999 | Nioche et al. ............... 700/121 |
| 6,283,368 | B1 | * | 9/2001 | Ormerod et al. ............ 235/380 |
| 6,406,579 | B1 | * | 6/2002 | De Vaujany ................. 156/176 |
| 6,427,827 | B1 | * | 8/2002 | Berndtsson .............. 198/626.6 |
| 2002/0081180 | A1 | * | 6/2002 | Berndtsson ................. 414/333 |
| 2003/0136503 | A1 | * | 7/2003 | Green et al. ................ 156/264 |
| 2004/0220696 | A1 | * | 11/2004 | Medioni et al. ............ 700/225 |

* cited by examiner

*Primary Examiner*—Diane I. Lee
(74) *Attorney, Agent, or Firm*—Michael J. Striker

(57) ABSTRACT

A device for processing integrated circuits by communication between them and at least one control unit has at least one circumferentially driven rotation-symmetrical carrier, at least one communication device provided on the carrier for communication with integrated circuits, and a path which surrounds the carrier, the integrated circuits forming parts of the path.

33 Claims, 4 Drawing Sheets

DEVICE FOR AND METHOD OF PROCESSING INTEGRATED CIRCUITS

BACKGROUND OF THE INVENTION

The present invention relates to a device for and method of processing integrated circuits by communication between them and at least one control unit.

A device of this type is known, in which the arrangement with integrated circuits is moved onto at least one control unit, wherein by communication between the at least one control unit and the movable integrated circuit its processing, for example a programming is performed. The disadvantage of this approach is that per time unit only relatively small possible data quantities are provided. If it is desired to provide a processing of greater data quantities, then the relative speed between the control unit and the integrated circuits must be reduced.

SUMMARY OF THE INVENTION

Accordingly, it is an object of the present invention to provide an arrangement for processing integrated circuits, which is formed so that with a simple construction a substantially greater data quantity per time unit is possible during processing of integrated circuits.

In keeping with these objects and with others which will become apparent hereinafter, one feature of the present invention resides, briefly stated, in a device for processing integrated circuits by communication between them and at least one control unit, comprising at least one circumferentially driven rotation-symmetrical carrier; at least one communication means provided on said carrier for communication with integrated circuits; and a path which surrounds said carrier, said integrated circuits forming parts of said path.

The invention deals with a method of processing of integrated circuits by communication between them and at least one control unit, wherein the integrated circuits during a predetermined time which is sufficient for their processing and/or path portion are held in any relative position to at least one communication means of a carrier and processed during this phase. The integrated circuits together with the communication means are moved relative to one another on an arcuate path or instead on a straight path without relative movement. In this phase the movement of the carrier with the communication means and the integrated circuit has a relatively great dwell time of the integrated circuit in the region of a carrier-side communication means, so that with the same continuous speed a substantially greater data quantity is possible. The arrangement in general is simpler and operationally safer.

For the contactless communication, at least one communication means of the carrier is formed as an antenna, in particular a coil, wherein a transmitting/receiving antenna can be provided. In correspondence with this, antennas are associated with the corresponding integrated circuits, which together with the circuits are arranged on or in the path, and thereby are parts of the path. Alternatively, for the contacting communication the at least one communication means of the carrier is formed by at least one contacting device, for example in form of a set of contact needles. In correspondence with this, the corresponding integrated circuit is provided with contacts, for example with contact faces, which are contacted by the contacting device during the processing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
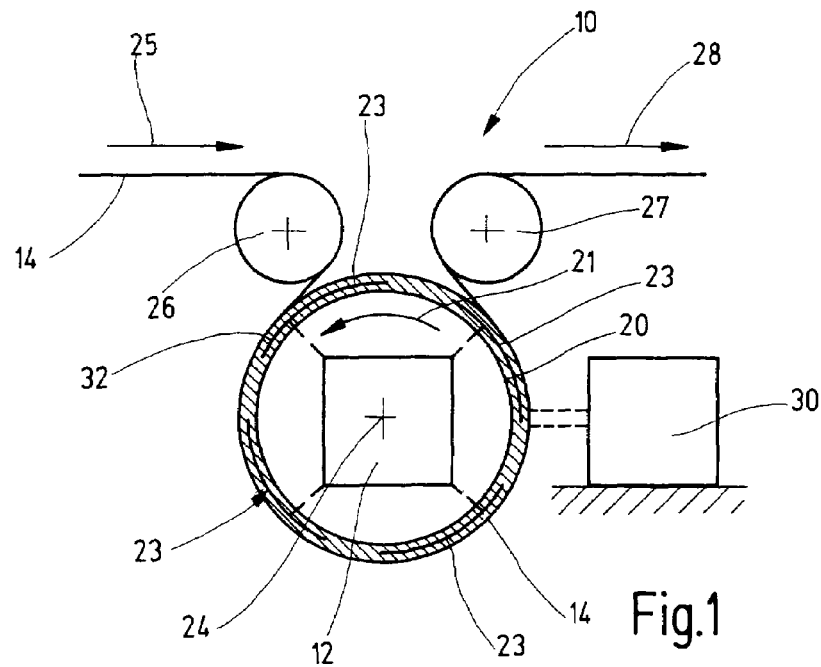
FIG. 1 shows a schematic partially sectioned side view of important parts of a device for processing of integrated circuits in accordance with a first embodiment of the present invention.
Figure 2:
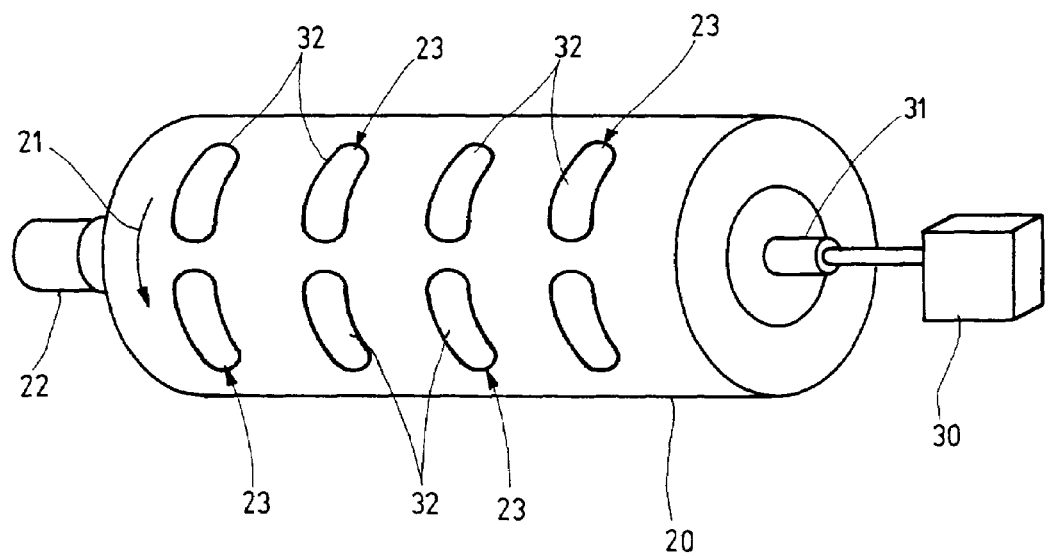
FIG. 2 is a schematic perspective view of a rotation-symmetrical carrier of the device for processing integrated circuits of FIG. 1.
Figure 3:
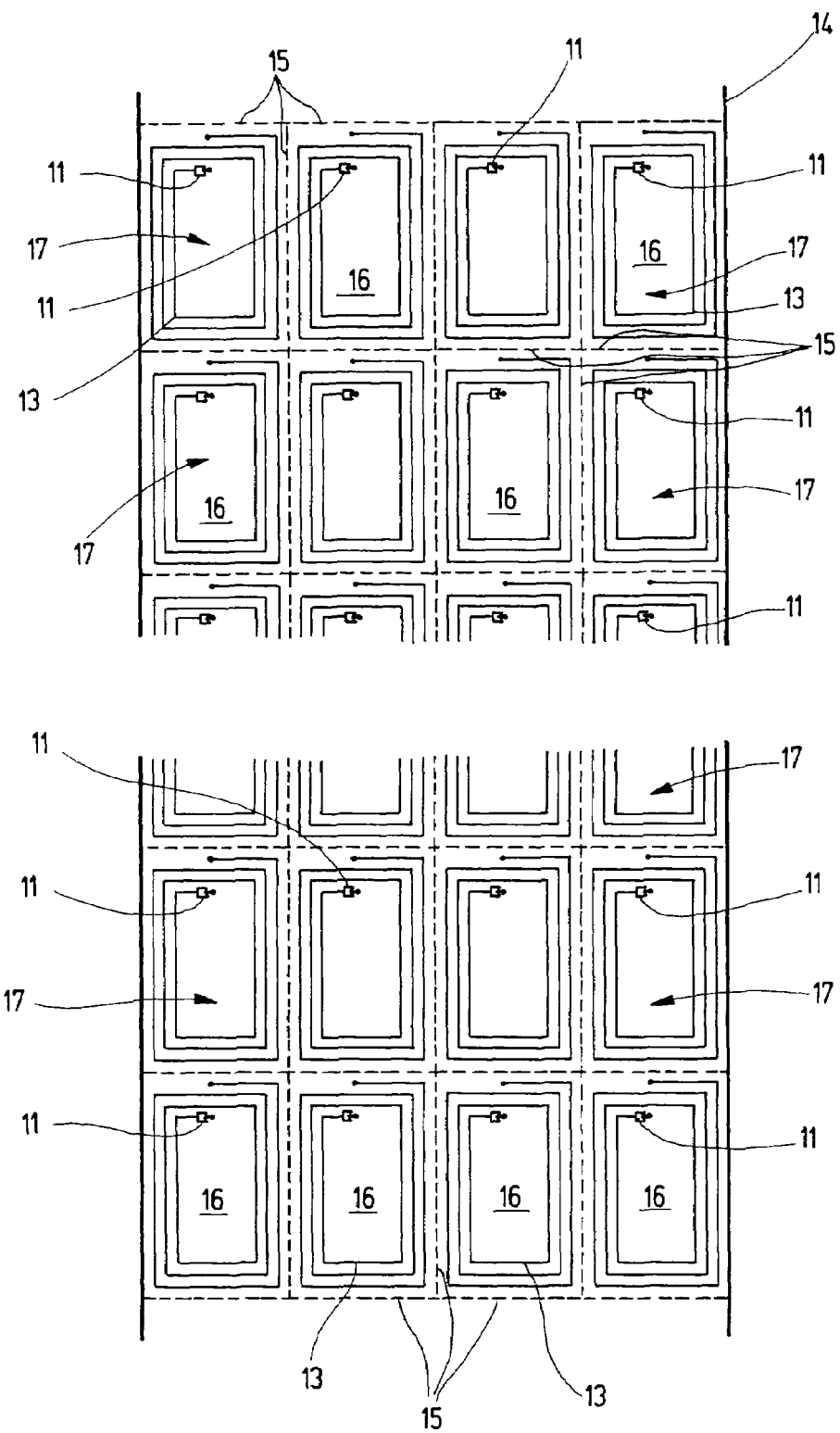
FIG. 3 shows a schematic plan view of a path in accordance with a first embodiment of the present invention, in which the integrated circuit and associated antennas are incorporated.

A device for processing integrated circuits in accordance with a first embodiment of the present invention is identified as a whole with reference numeral 10 and schematically shown in FIGS. 1–3. The device is used for processing of integrated circuits 11 by communication between the latter and at least one control unit 12. The control unit 12 is shown in FIG. 1 schematically and includes a control electronic system, for example a control computer. The term "processing" of the integrated circuits 11 includes any communication, for example the supply of informations, the reading of informations, the programming, etc.

Figure 4:
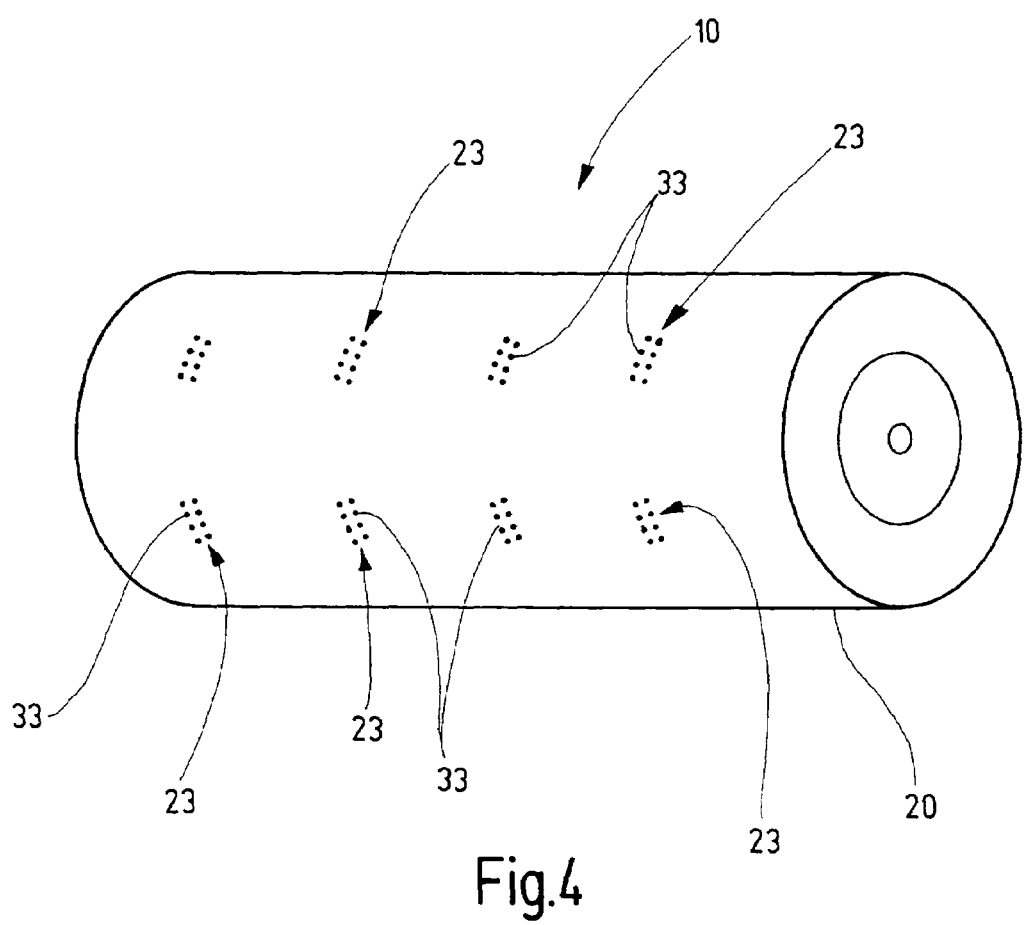
FIG. 4 is a schematic perspective view of a carrier of a device for processing integrated circuits in accordance with a second embodiment of the present invention.
Figure 5:
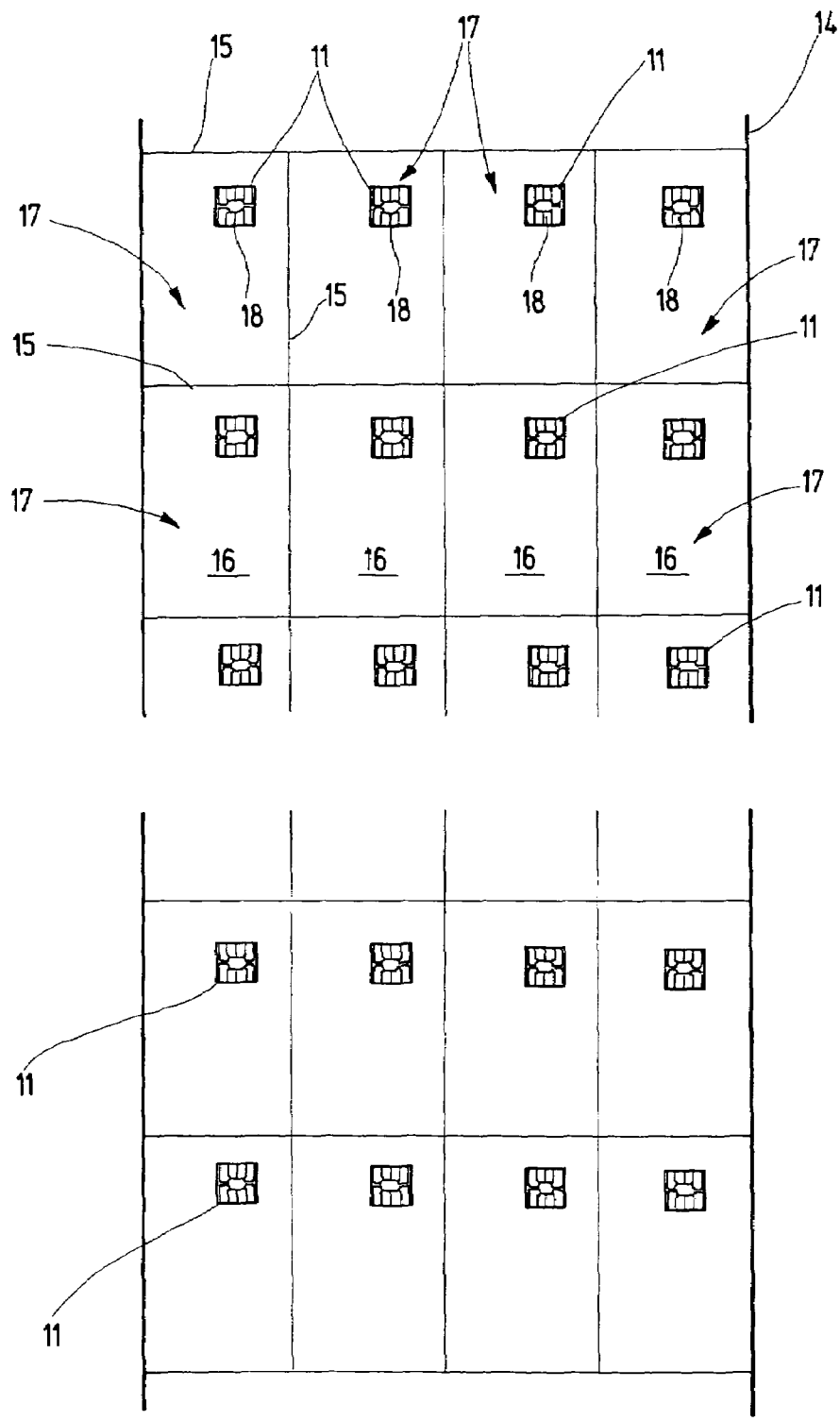
FIG. 5 is a schematic plan view of a path in accordance with a second embodiment of the present invention, in which the contacting integrated circuits are incorporated.

The electric circuits 11 are located conventionally on a substrate which is not shown in the drawings. The device 10 in accordance with a first embodiment shown in FIGS. 1–3 is formed for contactless communication with the integrated circuits 11, while the device 10 in accordance with the second embodiment shown in FIGS. 4 and 5 is formed for contacting communication with the integrated circuits 11.

As can be seen in particular from FIG. 3, the integrated circuits 11 are connected for the contactless communication with corresponding associated antennas 13 in form of coils, so that a communication with the integrated circuits 11 is possible wirelessly, via radio. The integrated circuits 11 together with the associated antenna 13 are parts of a path 14. In the shown embodiment the integrated circuits 11 with the associated antenna 13 are incorporated in the path 14. The path 14 has for example a central layer, in which the integrated circuits 11 with the associated antenna 13 are incorporated, and furthermore a layer which is moveable under them and over them. In accordance with another not shown embodiment, the integrated circuits 11 with the associated antenna 13 are mounted on the path 14, for example on the upper side or instead on the lower side. In all cases the integrated circuits with the associated antennas 13 are parts of the path 14.

The path 14 is formed as an endless path and composed for example of paper or the like, and also of another suitable or desired material. As shown in FIGS. 3 and 5, the broken lines 15 are located at the path. They must signal that later after the processing of the integrated circuits 11 the surface rectangular surface regions 16 of the path 14 which are surrounded by the lines 15 can form, after cutting off, individual chip cards 17. In the first embodiment with contactless communication these are contactless chip cards 17, and in the second embodiment of FIGS. 4 and 5 with contacting communications these are chip cards 17 which are provided with contacts 18, for example contact surfaces. In both embodiments the path 14, as seen transversely to the longitudinal direction of the path, has several longitudinal tracks of integrated circuits 11 (FIG. 5) or of integrated circuits 11 with associated antennas 13 (FIG. 3), wherein in FIGS. 3 and 5 the path 14 is formed as an endless path, for example a paper path, in a plane orientation.

The device 10 has at least one preferably rotation-symmetrical carrier 20 which is formed here as a cylinder, for example as a drum. The carrier 20 is driven circumferentially in direction of the arrow 21. The drive for the carrier can be formed as a motor 22, for example a gear motor or the like and is shown schematically in FIG. 2.

The carrier 20 is provided with at least one schematically shown communication means 23 for communication with the respective integrated circuit 11. In the embodiment of FIGS. 1–3, the path 14 has for example four longitudinal tracks with four integrated circuits 11 arranged near one another transversely to the longitudinal direction of the path. In a corresponding association, the carrier 20 is also provided with four identical communication means 23 which in the peripheral direction are arranged at a substantially identical distance from one another and in the direction of the rotary axis 24 of the carrier 20 are arranged at same transverse distances from one another as the four longitudinal tracks of the path 14, in particular the corresponding antennas 13.

For processing of the integrated circuits 11 as parts of the track 14, the track 14 is guided around the carrier 20 over a peripheral angle, for example more than 180° as shown in FIG. 1. The track 14 for this purpose is supplied in the direction of the arrow 25, deviated over a first deviating roller 26, moved from the latter around the outer cylindrical peripheral surface of the carrier 20, and after this is withdrawn over a second deviating roller 27 in direction of the arrow 28. The integrated circuit 11, during a predetermined time and/or path portion sufficient for processing, is held in any relative position to the at least one communication means 23 of the carrier 20 and processed during this phase. The integrated circuits 11 together with the communication means 23 are moved over a predetermined arcuate path by the cylindrical circumference of the carrier 20 without a relative movement between the communication means 23 on the one hand and the integrated circuits 11 with the antenna 13 on the other hand. The processing of the integrated circuits 11 is performed therefore during the looping around the carrier 20. After the processing the surface regions 16 of the path which have corresponding integrated circuits 11 and associated antennas 13, are cut along the lines 15, for example broken, to form individual chip cards 17 which are contactless in the first embodiment.

The surface regions 16 of the path 14 can instead be also tickets, labels, or other carriers with the integrated circuits 11 with associated antennas 13. Since the processing of the integrated circuits 11 is performed during the looping around the carrier 20, a relatively long dwell time of the integrated circuits 11 with the antennas 13 on the periphery of the carrier 20 in the corresponding region of the associated communication means 23 is provided. Therefore, during processing of the circuits 11 a great data quantity per time unit is possible, and this is achieved in exceptionally simple and reliable manner.

As can be seen from FIGS. 2 and 4, the respective communication means 23 are arranged on the cylindrical circumference of the carrier 20, here on its cylindrical casing. The control unit 12 is for example a part of the carrier 20 and arranged for example in its interior. It rotates together with the carrier 20. The corresponding communication means 23 are connected with the control unit 12. The control unit 12 is connected contactingly or contactlessly with at least one stationary schematically shown computer. The connection can be performed by schematically shown rotary transmission devices 31, formed for example as a slit ring device, an optical rotary distributor, or the like. During the circumferential movement of the carrier 20 the path 14 which surrounds the carrier 20 performs together with the carrier 20 a rotary movement without a relative movement with respect to the carrier 20.

The corresponding distance between the individual communication means 23 following in the peripheral direction of the carrier is dimensioned, when unwound on a plane, in correspondence of the distance between the integrated circuits 11 with the associated antennas which follow one another in the processing direction. In the device 10 in accordance with the first embodiment formed for contactless communication, each communication means 23 of the carrier 20 is composed of at least one antenna 32 which is shown schematically in FIG. 2 and composed of a corresponding coil. In correspondence with this, each circuit 11 has a corresponding antenna 13 on the path 14 or in the path 14.

In the second embodiment of the device, the communication means 23 of the carrier 20 are formed for contacting communication with the integrated circuits 11. Here each communication means 23 is composed of at least one contact device 33 which is brought in contact with the contacts 18 of the associated integrated circuit 11 of the path 14 for processing of the circuits 11. In other aspects the operation of the device 10 is the same as of the device in accordance with the first embodiment of the present invention. In accordance with a not shown embodiment, several carriers 20, in particular cylinders, can be provided in an arrangement near one another and/or behind one another. The several carriers can be assembled to a machine.

Furthermore, the several carriers 20 can be provided with communication means 23 for contactless and/or for contacting communication. This means that the several carriers 20 can have either identical communication means 23, for example in form of antennas 32, or instead in form of contacting devices 33, or instead also can be provided with the mixture of contactless and contacting communication means 23, such as antennas 32 and communication devices 33.

In accordance with another not shown embodiment of the present invention, the integrated circuits 11 together with communication means 23 can move relative to one another on a straight path 14, instead of a curved path, without relative movement, and can be processed during this phase.

It will be understood that each of the elements described above, or two or more together, may also find a useful application in other types of constructions and methods differing from the types described above.

While the invention has been illustrated and described as embodied in device for and method of processing integrated circuits, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for processing integrated circuits by communication between them and at least one control unit, comprising at least one circumferentially driven rotation-symmetrical carrier; at least one communication means provided on said carrier for communication with integrated circuits; and a path which surrounds said carrier, said integrated circuits forming parts of said path, wherein said communication means of said carrier are connected with said at least one control unit.

2. A device as defined in claim 1, wherein said carrier has a plurality of said communication means which are arranged at equal distances from one another in a circumferential direction.

3. A device as defined in claim 1, wherein said carrier has a rotary axis and is provided, when seen in direction of said rotary axis, with a plurality of longitudinal tracks arranged at substantially equal transverse distances from one another and provided with corresponding communication means.

4. A device as defined in claim 1, wherein said communication means are arranged on said cylindrical periphery of said carrier.

5. A device as defined in claim 1, wherein said communication means are embedded in a cylindrical casing of said carrier.

6. A device as defined in claim 1, wherein said communication means are embedded in a cylindrical casing of said carrier.

7. A device as defined in claim 1, wherein said at least one control unit is located in an interior of said carrier.

8. A device as defined 1, wherein said at least one unit rotates with said carrier; and further comprising at least one stationary computer connected with said control unit.

9. A device as defined in claim 8, wherein said at least one computer is connected with said at least one control unit in a contacting fashion.

10. A device as defined in claim 8, wherein said at least one computer is connected with said at least one control unit in a contactless fashion.

11. A device as defined in claim 8, wherein said at least one control unit is connected with said stationary computer by a means selected from the group consisting of a rotary transmitting device and an optical rotary distributor.

12. A device as defined in claim 11, wherein said rotary transmitting device is a slip ring device.

13. A device as defined in claim 1, wherein said carrier is formed with a cylinder.

14. A device as defined in claim 1, wherein said carrier is formed as a drum.

15. A device as defined in claim 1, wherein said integrated circuits are arranged on said path.

16. A device as defined in claim 1, wherein said integrated circuits are incorporated in said path.

17. A device as defined in claim 1, wherein said path which is guided around said carrier is formed as an endless path.

18. A device as defined in claim 17, wherein said endless path is formed as a paper path.

19. A device as defined in claim 1, wherein said path which is guided around said carrier is formed to perform with said carrier a rotary movement without a relative movement between said carrier and said path.

20. A device as defined in claim 1, wherein said path, as considered transversely to a longitudinal direction of said path, has a plurality of longitudinal tracks of said integrated circuits arranged at substantially equal transfer distances from one another.

21. A device as defined in claim 1, wherein a distance between said communication means arranged one after the other in a peripheral direction of said carrier corresponds, when unwound on a straight line, to a distance between said integrated circuits which follow one another in a path longitudinal direction.

22. A device as defined in claim 1, wherein said communication means and said integrated circuits are formed so as to provide a communication selected from the group consisting of a contactless communication, a contacting communication, and both.

23. A device as defined in claim 22, wherein for the contactless communication the at least one communication means of said carrier is formed as at least one antenna, and another antenna is associated with the corresponding integrated circuit, wherein at least one of said antennas is formed as a coil.

24. A device as defined in claim 23, wherein said other antenna is arranged in a position selected from the group consisting of on or in said path.

25. A device as defined in claim 23, wherein for the contacting communication the at least one communication means of said carrier is composed of at least one contacting device, and said integrated circuit is provided with contacts.

26. A device as defined in claim 25, wherein said contacts of said integrated circuit are formed as contact surfaces.

27. A device as defined in claim 25, wherein flat regions of said path which are provided with one of said circuits and one of said antennas form after cutting individual contactless chip cards.

28. A device as defined in claim 25, wherein flat regions of said path which have said integrated circuits form individual contacting chip cards after cutting.

29. A device as defined in claim 1; and further comprising another such carrier, said carriers being arranged in an orientation selected from the group consisting of one near the other, one behind the other, and both.

30. A device as defined in claim 29, wherein said carriers are provided with communication means for communication selected from the group consisting of a contactless communication, a contacting communication, and both.

31. A method of processing integrated circuits, comprising the steps of:
providing a communication between the integrated circuits and at least one control unit by means of at least one circumferentially driven rotation-symmetrical carrier and at least one communication means provided on said carrier for communication with said integrated circuits and connected with said at least one control unit,
providing a path which surrounds said carrier and wherein said integrated circuits form parts of said path,
holding the integrated circuits for a predetermined time and/or path portion that is sufficient for processing in a permanent relative position to said at least one communication means of said carrier and processing the integrated circuits during this phase.

32. A method as defined in claim 31; and further comprising moving the integrated circuits together with the communication means on an arcuate path without a relative movement.

33. A method as defined in claim 31; and further comprising moving said integrated circuits together with said communication means on a straight path without a relative movement.

* * * * *

UNITED STATES PATENT AND TRADEMARK OFFICE
CERTIFICATE OF CORRECTION

PATENT NO. : 7,004,400 B2
APPLICATION NO. : 10/655181
DATED : February 28, 2006
INVENTOR(S) : A. Berndtsson It is certified that error appears in the above-identified patent and that said Letters Patent is hereby corrected as shown below:

Column 5, line 37 delete Claim 6 and substitute: 6. A device as defined in Claim 1, wherein said at least one control unit is a part of said carrier and rotates together with said carrier.

Signed and Sealed this

Fifth Day of June, 2007

JON W. DUDAS
*Director of the United States Patent and Trademark Office*